United States Patent Office 3,737,433
Patented June 5, 1973

3,737,433
CERTAIN OXOALKYLDIMETHYLXANTHINES
Werner Mohler, Hofheim, Taunus, and Mario Reiser and Kurt Popendiker, Wiesbaden, Germany, assignors to Chemische Werke Albert Aktiengesellschift, Wiesbaden, Germany
No Drawing. Continuation of application Ser. No. 762,989, Sept. 26, 1968, which is a continuation-in-part of application Ser. No. 483,803, Aug. 30, 1965. This application Aug. 28, 1969, Ser. No. 854,032
Claims priority, application Germany, Sept. 5, 1964, C 33,811, C 33,812; July 2, 1965, C 36,289; July 10, 1965, C 36,362; July 24, 1965, C 36,493
Int. Cl. C07d 57/40
U.S. Cl. 260—256　　　　　　　　　　　　20 Claims

ABSTRACT OF THE DISCLOSURE

[(ω-1)-oxoalkyl]-3,7-dimethylxanthines in which the oxoalkyl has from 4 to 7 carbon atoms and 7-[(ω-1)-oxoalkyl]-1,3-dimethylxanthines in which the oxoalkyl has from 5 to 8 carbon atoms, while the keto group is separated from the xanthine nucleus by at least two carbon atoms. These compounds have a marked vaso-dilatory effect with a low toxicity.

---

This application is a continuation of application Ser. No. 762,989, filed on Sept. 26, 1968, and now abandoned. That application Ser. No. 762,989, was a continuation-in-part of application Ser. No. 483,803, filed on Aug. 30, 1965, and now U.S. Pat. 3,422,107.

It is already known to produce the 7-acetonyl-1,3- or the 1-acetonyl-3,7-dimethylxanthine respectively by reacting 1,3- or 3,7-dimethylxanthine respectively with haloacetone in the presenec of alkali hydroxide. Also the 7-(3'-oxobutyl)-1,3-dimethylxanthine, which has been obtained from 1,3-dimethylxanthine and methyl-β-diethylaminoethylketone, is already known. In these known compounds the carbonyl group is bound via one or two carbon atoms respectively with the xanthine-skeleton.

The present invention is now directed to

7-[(ω-1)-oxoalkyl]-1,3-dimethylxanthines or
1-[(ω-1)-oxoalkyl]-3,7-dimethylxanthines respectively of the formulae

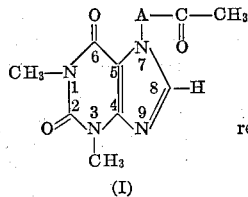　respectively　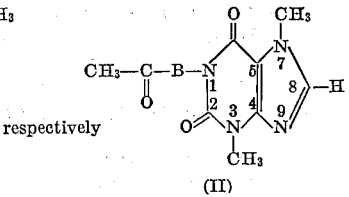

in which A means an alkylene group having 3 to 6, preferably 3 to 5 carbon atoms and B an alkylene group having 2 to 5, preferably 2 to 4 carbon atoms and the keto-group 2 to 5, preferably 2 to 4 carbon atoms and the carbon atoms from the xanthine skeleton. The groups A and B are generally straight-chained, but may, if desired, contain a side chain, above all on the carbon atom adjacent to the carbonyl group. Since the keto to which A or B is bound is separated from the xanthine nucleus by at least two carbon atoms, any side chain in A or B on a carbon adjacent to the keto is separated from the xanthine nucleus by at least one carbon atom. 2-alkyl-3-oxobutyl compounds exemplify such substances.

The compounds according to the invention are distinguished by a marked vaso-dilatory effect with a low toxicity. They have the surprising property of being readily soluble in lipids and in water. Hitherto no theophylline- or theobromine-derivatives being readily soluble in water and simultaneously easily dissolved in lipids, have been known. Owing to these favourable solubility characteristics, the compounds according to the invention are widely applicable for therapeutic purposes.

The compounds according to the invention may be prepared by any convenient method. According to a further feature of the invention, we provide the following process for the preparation of a compound of the Formula I or II:

(1) Reaction of theophylline or theobromine at elevated temperature and in an alkaline medium with an α,β-unsaturated methyl ketone of the formula $$H_2C=CR-CO-CH_3,$$

in which R represents an unbranched alkyl radical having from 1 to 4 carbon atoms in a reaction with theophylline, a hydrogen atom or an unbranched alkyl radical having from 1 to 3 carbon atoms in a reaction with theobromine, R in both cases preferably being methyl or ethyl;

(2) Reaction of a β-dialkylaminoethyl-methyl-ketone, the alkyl groups of which each have 1 or 2 carbon atoms, with theobromine in an aqueous-organic solution (this reaction is useful only for the preparation of theobromine derivatives according to the invention);

(3) Reaction of an (ω-1)-oxoalkyl halide of the formula $CH_3-CO-A-Hal$ (in a reaction with theophylline) or $CH_3-CO-B-Hal$ (in a reaction with theobromine) in which Formulae A and B are as hereinbefore defined and Hal represents a halogen atom, preferably bromine or chlorine, with an alkali metal salt of theophylline or theobromine respectively, preferably in an aqueous-organic solution;

(4) Reaction of an 1-(ω-haloalkyl)-3,7-dimethylxanthine or 7-(ω-haloalkyl)-1,3-dimethylxanthine of the formulae

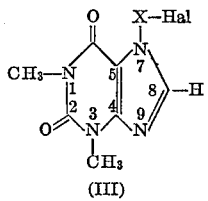　　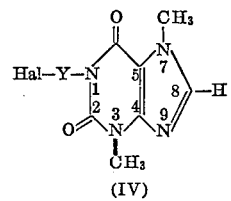

respectively, in which X represents an alkylene group, preferably unbranched, having 2 to 5 carbon atoms, Y represents an alkylene group, preferably unbranched, having 2 to 4 carbon atoms, and Hal is as hereinbefore defined, with an alkali metal salt, preferably the sodium salt, of ethyl acetoacetate. The reaction product being subjected to ketonic hydrolysis. The last method forms, therefore, products in which at least 3 carbon atoms are present between the keto-group and the nitrogen atom.

The said reactions are carried out in any convenient manner, generally at a temperature of 50 to 150° C., preferably 60–120° C., and if desired at elevated or reduced pressure, but usually at atmospheric pressure. The various components may be used in stoichiometrical proportions, but economic reasons may make the use of non-stoichiometrical proportions desirable. In process (3) preformed alkali metal salts may be used, but they are preferably produced in the reaction mixture. In process (1) it is advantageous to use a strong alkali in an aqueous-organic solution. The ketonic hydrolysis of process (4) is carried out in the usual manner. Preferred solvents are water-miscible, e.g. methanol, ethanol, propanol, isopropanol or the various butanols, acetone, pyridine, polyhydric alcohols (e.g. ethylene glycol), and ethylene glycol monomethyl ether or ethylene glycol monoethyl ether.

The substances of the invention may be applied per se or together with a carrier, an excipient or a solvent and administered in any desired manner. Thus, they may be dissolved or applied intravenously in water or pharmaceutically compatible aqueous solutions, such as diluted sodium chloride solution. They may also be applied orally either in solution or in solid form. In the preparation of tablets, for example, conventional tabletting procedures may be employed and the active ingredient may be associated with one or more tabletting excipients, such as starch, lactose, mannitol, hardened gelatine and talc. In the preparation of capsules the active ingredient may be filled into the capsule cases either with or without a diluent.

For the better understanding of the invention, the following examples are given by way of illustration only:

EXAMPLE 1

(A) A solution of 10.0 g. of 1-bromohexanone-5 in 100 ml. of ethanol was gradually mixed at the boil with vigorous stirring with 11.3 g. of the sodium salt of theophylline in 100 ml. of water. After 3 hours' refluxing the alcohol was distilled off, and the residual aqueous phase was cooled and made alkaline and extracted with chloroform. The chloroform solution was evaporated and the residue recrystallized from a little isopropanol to yield 7-(5'-oxohexyl) - 1,3 - dimethylxanthine of melting point 75–76° C. in a yield of about 80% (calculated on the reacted theophylline).

(B) 26.0 g. of 1-bromopentanone-4, dissolved in 100 ml. of ethanol, and 31.0 g. of theophylline-sodium in 175 ml. of water, were reacted according to the same method, and the product was chromatographed upon silica gel and eluted with a mixture of chloroform and ethanol (9:1 by volume). The main fraction was recrystallized from cyclohexane/ethyl acetate (4:1 by volume) to yield 7-(4'-oxopentyl) - 1,3 - dimethylxanthine of melting point 86–88° C.

EXAMPLE 2

A solution of 1.4 g. of sodium in 75 ml. of absolute ethanol was refluxed for 4 hours with 7.8 g. of ethylacetoacetate and 18.0 g. of 7-(3'-bromopropyl) - 1,3 - dimethylxanthine. After separating the sodium bromide and subsequent evaporation of the alcohol, the remaining residue was vigorously stirred with 72 ml. of 5% sodium hydroxide for 2 hours at room temperature. The aqueous phase was separated, acidified with 7.2 ml. of semiconcentrated sulfuric acid and refluxed. After decarboxylation was complete, the solution was made alkaline and extracted with chloroform. The chloroform solution was evaporated and the residue was chromatographed upon silica gel and eluted with a mixture of chloroform and ethanol (9:1 by volume). The main fraction was recrystallized from isopropanol to yield 7-(5'oxohexyl) - 1,3 - dimethylxanthine of melting point 75–76° C. in about 60% yield.

EXAMPLE 3

1.2 g. of sodium, dissolved in 90 ml. of absolute ethanol, 6.7 g. of ethyl acetoacetate, and 16.0 g. of 7-(4'-bromobutyl) - 1,3 - dimethylxanthine were reacted according to the method of Example 2, the similar isolation procedure requiring 64 ml. of 5% sodium hydroxide and 6.4 ml. of semi-concentrated sulfuric acid. The residue from evaporation of the chloroform solution was chromotographed upon silica gel and eluted with a mixture of chloroform and ethanol (9:1 by volume). The main fraction was recrystallized from isopropanol to yield 7-(6'-oxoheptyl) - 1,3 - dimethylxanthine of melting point 69° C. in about 60% yield.

EXAMPLE 4

The procedure of Example 2 was repeated by reaction of 0.28 g. of sodium, dissolved in 30 ml. of absolute ethanol, 1.6 g. of ethyl acetoacetate and 3.9 g. of 7-(5'-bromopentyl) - 1,3 - dimethylxanthine; 16 ml. of 5% sodium hydroxide and 1.6 ml. of semi-concentrated sulfuric acid were used in the isolation. 7-(7'-oxo-octyl)-1,3-dimethylxanthine was obtained in about 60% yield upon evaporation of the chloroform solution and after recrystallisation from isopropanol melted at 85° C.

EXAMPLE 5

(A) A solution of 25.0 g. of 2-ethylbutenone-3 in 50 ml. of absolute ethanol was gradually mixed at the boil with stirring with a solution of 25.0 g. of theophylline and 13 ml. of normal sodium hydroxide in 150 ml. of a mixture of ethanol and water (1:1 by volume). After 3 hours' reflux the alcohol was distilled off, and the residual aqueous phase was made alkaline and extracted with chloroform. The residue from evaporation of the chloroform solution was recrystallized from isopropanol to yield 7-(2' - ethyl - 3' - oxobutyl) - 1,3 - dimethyl xanthine of melting point 107–108° C. in about 60% yield.

(B) 33.0 g. of 2-methylbutenone-3, dissolved in 50 ml. of ethanol and a solution of 38.5 g. of theophylline and 20 ml. of normal sodium hydroxide in 200 ml. of a maxture of ethanol and water (1:1 by volume) were reacted according to the same method, and the product was isolated in the same manner to yield 7-(2'-methyl-3'-oxobutyl) - 1,3 - dimethylxanthine of melting point 133–135° C.

EXAMPLE 6

1.8 g. of theobromine, 0.8 g. of methylvinyl ketone and 15 ml. of dry pyridine were refluxed for 3 hours. The solvent was removed in vacuo and the residue was recrystallized from isopropanol. 1-(3' - oxobutyl)-3,7-dimethylxanthine of melting point 144–146° C. was obtained in a yield of about 70%.

EXAMPLE 7

1.8 g. of theobromine, 5.0 g. of 2-methylbutenone-3, 1.0 ml. of normal sodium hydroxide and 50 ml. of a mixture of ethanol and water (1:1 by volume) were refluxed for 3 hours. The clear solution obtained was then neutralized with 1.0 ml. of normal hydrochloric acid and concentrated in vacuo to dryness. The residue was dissolved in water and extracted with chloroform. The chloroform solution was dried over sodium sulfate and evaporated, the colourless syrupy residue was chromatographed upon silica gel and eluted with a mixture of chloroform and ethanol (9:1 by volume). 1-(2'-methyl - 3' - oxobutyl) - 3,7 - dimethylxanthine was obtained as a pure main fraction in about 75% yield in the form of a colourless syrup; it formed a 2,4-dinitrophenylhydrazone of melting point 203–205° C.

EXAMPLE 8

A solution 35.4 g. of 1-bromohexanone-5 in 200 ml. of ethanol was gradually mixed at the reflux temperature with vigorous stirring with 39.7 g. of theobromine-sodium in 100 ml. of water. After 3 hours' reflux the unreacted theobromine was filtered off with suction, the filtrate was evaporated to dryness, the residue was dissolved in water and the solution was extracted with chloroform. The chloroform was distilled off and 1-(5'-oxohexyl)-3,7-dimethylxanthine was obtained as residue; after recrystallisation from isopropanol, it melted at 102–103° C. (about 25% yield, calculated on the reacted theobromine).

EXAMPLE 9

10.7 g. of methyl-β-chloroethylketone, dissolved in 150 ml. of ethanol, and 20.2 g. of theobromine-sodium, dissolved in 100 ml. of water, were reacted according to the process of Example 8. After isolation and recrystallisation from isopropanol, 1-(3'-oxobutyl)-3,7-dimethylxanthine of melting point 144–146° C. was obtained in about 70% yield.

EXAMPLE 10

A solution of 1.0 g. sodium in 75 ml. of anhydrous ethanol was refluxed for 4 hours with 5.4 g. of ethylacetoacetate and 13.0 g. of 1-(4'-bromobutyl)-3,7-dimethylxanthine. After separation of the sodium bromide and subsequent distillation of the alcohol, the residue obtained was intensively stirred for 2 hours with 52 ml. of 5% sodium hydroxide. The aqueous phase was separated, acidified with 5 ml. of semi-concentrated sulfuric acid, and refluxed. After the decarboxylation was completed, the solution was made alkaline and extracted with chloroform. The chloroform solution was evaporated and the residue was recrystallized from isopropanol to yield 1-(6'-oxoheptyl)-3,7-dimethylxanthine in about 60% yield. After a further recrystallisation from water, this substance melted at 119–120° C.

EXAMPLE 11

(A) 1.4 g. of sodium, dissolved in 75 ml. of absolute ethanol, 7.8 g. of ethyl acetoacetate and 18.0 g. of 1-(3'-bromopropyl)-3,7-dimethylxanthine were reacted according to the method of Example 10, the similar isolation producedure requiring 72 ml. of 5% sodium hydroxide and 7.2 ml. of semi-concentrated sulfuric acid. The residue from evaporation of the chloroform solution was chromatographed upon silica gel and eluted with a mixture of chloroform and ethanol (9:1 by volume). The main fraction was recrystallized from isopropanol to yield 1 - (5' - oxohexyl) - 3,7-dimethylxanthine of melting point 102–103° C. in about 70% yield.

(B) Similarly 1.2 g. of sodium, dissolved in 100 ml. of absolute ethanol, 6.5 g. of ethyl acetoacetate and 14.4 g. of 1-(2'-bromoethyl)-3,7-dimethylxanthine were reacted; isolation required 60 ml. of 5% sodium hydroxide and 7 ml. of semi-concentrated sulfuric acid. The product was 1-4'-oxopentyl)-3,7-dimethylxanthine of melting point 111° C.

EXAMPLE 12

25.0 g. of theobromine, 27.0 g. of 2-ethylbutenone-3, 14.0 ml. of normal sodium hydroxide and 150 ml. of a mixture of ethanol and water (1:1 by volume) were refluxed for 12 hours. The solution obtained was then neutralized and the unreacted theobromine was filtered off. The alcohol was distilled off in vacuo, and the residual aqueous solution was made alkaline, and extracted once with a little petroleum ether and then with chloroform. Evaporation of the chloroform solution yielded as residue in about 70% yield (calculated on the reacted theobromine) a colourless oil 1-(2'-ethyl-3'-oxobutyl)-3,7-dimethylxanthine, which formed a 2,4-dinitrophenylhydrazone of melting point 200–205° C.

EXAMPLE 13

15.6 g. of theobromine, 100 ml. of water and 10.0 g. of β-dimethylaminoethyl-methyl-ketone were refluxed for 3 hours. Then the reaction mixture was weakly acidified with 10% hydrochloric acid and filtered from the unreacted theobromine. The filtrate was made alkaline and extracted with chloroform. The residue from evaporation of the chloroform solution was recrystallized from isopropanol to yield 1-(3'-oxobutyl)-3,7-dimethylxanthine of melting point 143–144° C. in about 40% yield (calculated on reacted theobromine).

The properties of some of the compounds according to the invention, namely 7-(6'-oxoheptyl)-1,3-dimethylxanthine (I) (Example 3), 7-(5'-oxohexyl)-1,3-dimethylxanthane (II) Examples 1A and 2),, 7-(4'-oxopentyl)-1,3-dimethylxanthine (III) (Example 1B), 7-(2'-methyl-3'-oxobutyl)-1,3-dimethylxanthine (IV) (Example 5B), 7-(2' - ethyl - 3'-oxobutyl)-1,3-dimethylxanthine (V) (Example 5A) are compared in the following table with those of the parent substance 1,3-dimethylxanthine (theophylline) (VI), with the commercial 7-(β,γ-dihydroxypropyl)-1,3-dimethylxanthine (VII), and with the previously known 7-acetonyl-1,3-dimethylxanthine (VIII) and 7-(3'-oxobutyl)-1,3-dimethylxanthine (IX); moreover, the properties of 1-(5'-oxohexyl)-3,7-dimethylxanthine (X) (Examples 8 and 11A), 1-(4'-oxopentyl)-3,7-dimethylxanthine (XI) (Example 11B) and 1-(3'-oxobutyl)-3,7-dimethylxanthine (XII) (Examples 6, 9 and 13), 1-(2'-methyl-3' - oxobutyl) - 3,7-dimethylxanthine (XII) (Example 7) and 1-(2'-ethyl-3'-oxobutyl)-3,7-dimethylxanthine (XIV) (Example 12) are compared with those of the parent substance 3,7-dimethylxanthine (theobromine) (XV), the commercial 1-(2'-hydroxypropyl)-3,7-dimethylxanthine (XVI) and the previously known 1-acetonyl-3,7-dimethylxanthine (XVII) (which has not been pharmacologically studied previously).

| | Solubility | | Vasodilatory activity [1] | LD$_{50}$ mg. kg., mouse (per os) |
|---|---|---|---|---|
| | G. substance/ 100 ml. water (room temperature) | G. substance/ 100 g. benzene (room temperature) | | |
| I | ca. 400 | 170 | 56 | 750–1000 |
| II | ca. 400 | 94 | 100 | 750–1000 |
| III | ca. 400 | 9 | 84 | 750–1000 |
| IV | 1.2 | 4.4 | 85 | 1,000–1,200 |
| V | 5.9 | 27 | 98 | 1,000–1,100 |
| VI | 0.5 | 0.03 | 58 | 327 |
| VII | 18 | 0.05 | 4 | 1,954 |
| VIII | 3 | 1 | 48 | 750–1,000 |
| IX | 6 | 1 | 29 | 500–750 |
| X | 95 | 11 | 93 | 1,385 |
| XI | 38 | 7 | 53 | >1,400 |
| XII | 16 | 2 | 45 | ca. 1,500 |
| XIII | 120 | 45 | 95 | 500–750 |
| XIV | 8 | >170 | 75 | 500–750 |
| XV | 0.03 | 0.009 | 26 | 1,500 |
| XVI | .92 | 0.3 | 11 | 1,066 |
| XVII | 3.6 | 1 | 48 | 905 |

[1] The vaso-dilatory activity was determined according to Krawkow-Pissemski on an isolated rabbit ear, with Ringer's solution at a concentration of 0.1 mg. substance/ml. 1-(m-hydroxyphenyl)-2-aminoethanol hydrochloride (0.5 γ/ml.) was added to the nutrient solution to improve vasotonia.

It is evident from the table that the compounds according to the invention have good solubility in lipids and also surprisingly a very good solubility in water, as distinct from the hitherto known derivatives of 1,3- or 3,7-dimethylxanthine. A surprising further pharmaceutical application of those oxoalkyldimethylxanthines of the invention which are freely soluble in water, e.g. at least 4%, is that these derivatives considerably improve the water solubility of other therapeutically useful substances. Thus various therapeutically effective substances cannot be administered to human beings or animals parenterally, i.e. by injection, although such parenteral use would have therapeutic advantages over oral or rectal use, since aqueous solutions of a concentration necessary for injection cannot be obtained owing to the sparing solubility of such substances in water. Various attempts have already been made to dissolve such substances by suitable solubilisers. For example, modified polyoxyethylenes, so called "Tweens" have been used; these compounds, however, are not pharmacologically inert and therefore cause undesired side-effects. It is also known that theophylline (a compound frequently used therapeutically which is not suitable for injection as it is too insoluble in water in the forms both of its base and of various moderately water-soluble addition-compounds) may be dissolved in water by means of ethylene diamine, which acts as a solubiliser, the resulting more concentrated solutions being suitable for injection and often used.

The discovery that the compounds of the invention are solubilisers for various therapeutically useful substances is therefore an important advance. Thus it is possible to produce for example a 1.4% aqueous solution of khelline (which compound is soluble only to the extent of 20 mg. per 100 ml. of water at room temperature) in a 10% aqueous solution of 1-oxohexyl-3,7-dimethylxanthine. The solubility of caffeine may be improved by more than the tenfold by the addition of 1-oxohexyl-3,7-dimethylxanthine. This solubilising effect is not only limited to these substances, but surprisingly also applies to alkaloids, e.g. yohimbine, corynanthine and derivatives thereof, and various other substances, e.g. nicotinic acid esters, as is evident from the following table.

Solubility of various therapeutically active substances in water and in aqueous solutions of the afore-said compounds I, II, X and XII

| Substance | Solubility, g. substance/100 ml. water at room temperature | Solution of— | | | | |
|---|---|---|---|---|---|---|
| | | I (10%) | II (10%) | X (10%) | X (30%) | XII (10%) |
| Pentaerythritoltetranicotinate | insoluble | | | 0.1 | 1.0 | |
| Rutine | 0.01 | | | | 0.6 | |
| Reserpine-hydrochloride | 0.01 | | | | 0.3 | |
| Khelline | 0.02 | 1.3 | 1.3 | 1.4 | 4.5 | 1.4 |
| Theobromine | 0.03 | | | | 0.2 | |
| Glycerol-trinicotinate | 0.03 | 1.0 | 1.0 | 1.0 | 6.6 | 1.0 |
| 5-phenyl-5-(3′-oxobutyl-) barbituric acid | 0.04 | | | | 1.3 | |
| 1-hexyl-3,7-dimethylxanthine | 0.08 | | 0.3 | 0.3 | 0.7 | |
| Ergotamin-tartrate | 0.1 | | | >2.5 | >5 | |
| O-phenacetyl-N-acetylcorynanthine-hydrochloride | 0.1 | | 1.9 | 1.7 | 8.0 | |
| Theophylline | 0.5 | 1.6 | 1.8 | 2.1 | 4.0 | 2.4 |
| Yohimbine-hydrochloride | 0.8 | | 2.5 | 2.5 | 4.0 | |
| Caffeine | 1.5 | | 8.0 | 8.0 | 15.6 | |

The following compounds have been compared with regard to their vaso-dilatory activity on an isolated rabbit ear according to Krawkow-Pissemski and with regard to their toxicity. The compounds are designated by the same Roman numerals set forth above, i.e. the numerals have the following meaning:

(IV) 7 - (2′ - methyl-3′-oxobutyl)-1,3-dimethylxanthine (Example 5B)
(V) 7 - (2′ - ethyl - 3′ - oxobutyl)-1,3-dimethylxanthine (Example 5A)
(VI) 1,3-dimethylxanthine (theophylline(
(VII) 7-(β,γ-dihydroxypropyl)-1,3-dimethylxanthine
(VIII) 7-acetonyl-1,3-dimethylxanthine
(IX) 7-(3′-oxobutyl)-1,3-dimethylxanthine
(X) 1-(5′-oxohexyl)-3,7-dimethylxanthine (Examples 8 and 11A)
(XI) 1 - (4′-oxopentyl)-3,7-dimethylxanthine (Example 11B)
(XII) 1 - (3′ - oxobutyl) - 3,7 - dimethylxanthine (Examples 6, 9 and 13)
(XV) 3,7-dimethylxanthine (theobromine)
(XVI) 1-(2′-hydroxypropyl)-3,7-dimethylxanthine
(XVII) 1-acetonyl-3,7-dimethylxanthine Compounds IV, V and X to XII have been prepared according to the examples indicated above. Compounds VIII, IX and XVII have been prepared according to known methods, while compounds VI, VII, XV and XVI were commercially available.

Thus, compounds IV, V and X to XII have been compared with the most active known xanthine derivatives hitherto used due to their vaso-dilatory activity (compounds VI, VII, XV and XVI). Additionally compounds IV, V and X to XII have been compared with the known homologs VIII, IX and XVII, which were not yet recommended as pharmaceuticals having a vaso-dilatory activity and were, at least in part, not yet studied in this regard, as compound XVII. The comparison was carried out according to Krawkow and Pissemski, a method widely used in the art. This method was described by:

N. Krawkow, Pflugers Archiv. vol. 151 (1913), page 583, vol. 157 (1914), page 501, and journal "Experimentelle Medizin," vol. 27 (1922), page 127; see also S. A. Pissemski, Pflugers Archiv., vol 156 (1914), page 426. In detail it was carried out as follows:

The substance to be tested was dissolved in Ringer's solution, as modified by Uhlmann and Nobile in Naunym-Schmiedeberg, Archiv. fur experimentelle Pathologie and Pharmakologie, vol. 192 (1939), page 189, at a concentration of 0.1 mg. substance per ml. of modified Ringer's solution. In order to improve vasotonia, 1-(m-hydroxyphenyl)-2-aminoethanol hydrochloride was added in a concentration of 0.5 gamma per ml. solution. The solution leaving the ear vein was gathered in a collecting reservoir and the volume was determined and indicated by an automatic registration device. In accordance with the standard practice in the art, the maximum volume perfused—per unit to time—through the ear after the addition of the substance to be tested was compared with the volume perfused per unit of time before the addition of said substance. The percent values thus obtained were then compared with the values of the basic compound XV. These latter comparison values are hereinafter referred to as "activity relative to XV." The results are contained in the table below.

The toxicity was determined according to the method of Behrens (described in Naunym-Schmiedeberg, Archiv fur experimentelle Pathologie und Pharmakologie, vol. 140 (1929), page 237 and vol. 230 (1957), page 59) by oral administration of the substances to be tested. For testing compounds VI, VIII, X, XI, XV, XVI and XVII at least forty mice each were used. The values were obtained after 24 hours and determined by graphic interpolation by means of the so-called probability net. The toxicity of compound XI was determined as a minimum value only with 75 mice. For testing the other compounds (IV, V, IX and XII) at least twelve mice each were used; it was deemed unnecessary to determine the exact $LD_{50}$ of these compounds; even when calculating with the best toxicity value for compound IX it can be stated in consideration of the values for the vaso-dilatory activity that this compound is inferior to the compounds IV, V and X to XII. With regard to compounds IV, V and XII it has to be stated that even when calculating the worst values (for compounds IV and V) or the approximate value (compound XII) in consideration of their vaso-dilatory activities these compounds are superior to the known compounds VI to IX and XV to XVII. Therefore the toxicity of these compounds is expressed in the form of ranges (compounds IV, V and IX) or as an approximate value (compound XII). The toxicity of compound VII was taken from J. D. McColl, J. M. Parker and J. K. W. Ferguson, Journal of Pharmacology and Experimental Therapy, vol. 116 (1956), page 343.

The results are evident from the following table:

| Compound | | Vaso-dilatory activity relative to XV | $LD_{50}$ in mg./kg. per os (mouse) | Activity quotient |
|---|---|---|---|---|
| IV | Invention | 321 | 1,000–1,200 | 2.1–2.6 |
| V | do | 371 | 1,000–1,100 | 2.5–2.7 |
| VI | Known | 221 | 325±24 | 0.5 |
| VII | do | 17 | 1,954 | 0.2 |
| VIII | do | 171 | 812±38 | 0.9 |
| IX | do | 108 | 500–750 | 0.3–0.5 |
| X | Invention | 354 | 1,385±102 | 3.3 |
| XI | do | 200 | >1,400 | >1.9 |
| XII | do | 171 | ca. 1,500 | 1.7 |
| XV | Known | 100 | 1,500±97 | 1.0 |
| XVI | do | 42 | 1,066±38 | 0.3 |
| XVII | do | 183 | 905±67 | 1.1 |

In this table $LD_{50}$ indicates the dose at which 50% of the tested animals die. The activity quotient is represented by the equation $$\frac{LD_{50}}{(\text{vaso-dilatory activity})^{-1}}$$

in which the activity quotient of theobromine has been given the value 1.

It is evident from the foregoing table that the compounds of the invention (compounds IV, V and X to XIV) are superior to the known compounds due to the remarkably more favorable relation between their toxicities and vaso-dilatory activities, while the comparison compounds VI to IX and XV to XVII have either a lower activity or a higher toxicity. Thus, compounds IV and V in the most unfavorable case show an increase in their activity of 45% over compounds VI to IX, which are chemically closely related to compounds IV and V, and of more the tenfold over the commercially used compound VII. Similar considerations are applicable to compound X in comparison with compounds XV to XVII and to compounds XI and XII in comparison with compounds XV and XVI. Compounds XI and XII are also superior to compounds XI and XII in comparison with compounds In more detail it is to be observed that the activity and the toxicity of compound IV are improved by three times (activity) and 100% (toxicity) compared with the corresponding data of the unsubstituted oxobutyl compound IX. An improvement of three times in activity and 100% in toxicity has to be considered as a difference in kind rather than in degree. Compound V is distinguished from the homologous known compounds VIII and IX by its improved activity (which is twice that of compound VIII and four times that of compound IX), while the toxicity is also improved.

With regard to compound X it is to be noted that the vaso-dilatory activity is double as high as that of compound XVII and 3.5 times as high as that of compound XV. Surprisingly the toxicity of compound X is also by 50% better than that of compound XVII.

Compound XI is distinguished from the basic compound XV and the commercially used compound XVI by its improved activity, which is twice that of compound XV and almost five times that of compound XVI. The superiority over compound XVII is evident from the improved $LD_{50}$ which is more than 50% better.

Compound XII has a toxicity being 40% better than that of compound XVI and more than 65% better than that of compound XVII and an activity being about 4 times that of compound XVI which is commercially used.

Other aspects in which the compounds of the invention are superior to the known compounds will be evident from a more detailed review of the toxicity and activity data of the table.

It should also be noted that the toxicity of compounds X, XI and XII in which four, three and two methylene groups respectively are present between the xanthine nucleus and the oxo group, is almost equal and about 50% lower than that of compound XVII, having only one methylene group between the xanthine nucleus and the oxo group. This difference in the toxicity, caused by the introduction of one methylene group into compound XVII, is believed to be highly surprising.

What we claim is:

1. A compound selected from the group consisting of 7-[(ω-1)-oxoalkyl]-1,3-dimethylxanthines and 1-[(ω-1)-oxoalkyl]-3,7-dimethylxanthines of the formulae

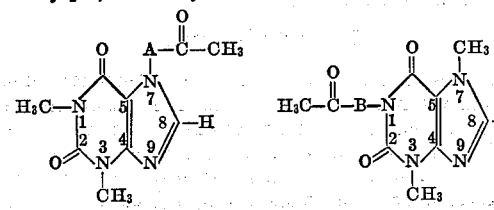

respectively, in which A represents an alkylene having from 3 to 6 carbon atoms and B represents an alkylene having from 2 to 5 carbon atoms and in which the keto to which A or B is bound is separated from the xanthine nucleus by at least 2 carbon atoms.

2. A compound as claimed in claim 1 wherein A represents an alkylene having from 3 to 5 carbon atoms and wherein B represents an alkylene having from 2 to 4 carbon atoms.

3. A compound as claimed in claim 1 wherein the keto is separated from the xanthine nucleus by 3 to 4 carbon atoms.

4. A compound as claimed in claim 1 wherein A and B are straight-chained.

5. A compound as claimed in claim 1, wherein said compound has the formula

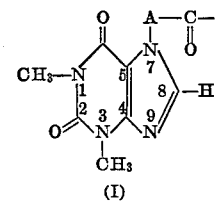

(I)

in which A is an alkylene having from 3 to 6 carbon atoms and in which the keto group is separated from the xanthine nucleus by 2 to 5 carbon atoms.

6. A compound as claimed in claim 5, wherein said compound is 7-(6'-oxoheptyl)-1,3-dimethylxanthine.

7. A compound as claimed in claim 5, wherein said compound is 7-(5'-oxohexyl)-1,3-dimethylxanthine.

8. A compound as claimed in claim 5, wherein said compound is 7-(4'-oxopentyl)-1,3-dimethylxanthine.

9. A compound as claimed in claim 5, wherein said compound is 7-(2'-methyl-3'-oxobutyl)-1,3-dimethylxanthine.

10. A compound as claimed in claim 5, wherein said compound is 7-(2'-ethyl - 3' - oxobutyl)-1,3-dimethylxanthine.

11. A compound as claimed in claim 1, wherein said compound has the formula

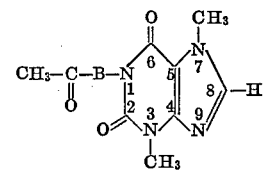

in which B is an alkylene having from 2 to 5 carbon atoms and in which the keto group is separated from the xanthine nucleus by 2 to 5 carbon atoms.

12. A compound as claimed in claim 11, wherein B is a straight-chained alkylene.

13. A compound as claimed in claim 11, wherein said compound is 1-(5'-oxohexyl)-3,7-dimethylxanthine.

14. A compound as claimed in claim 11, wherein said compound is 1-(4'-oxopentyl)-3,7-dimethylxanthine.

15. A compound as claimed in claim 11, wherein said compound is 1-(3'-oxobutyl)-3,7-dimethylxanthine.

16. A compound as claimed in claim 11, wherein said compound is 1-(2'-methyl-3'-oxobutyl)-3,7-dimethylxanthine.

17. A compound as claimed in claim 11, wherein said compound is 1-(2'-ethyl-3'-oxobutyl) - 3,7 - dimethylxanthine.

18. A compound according to claim 1 wherein each of A and B contains a side chain bound to its carbon adjacent to said keto, the carbon being separated from the xanthine ring by at least one carbon atom.

19. A compound according to claim 1 wherein A is branched, said branching being at the carbon adjacent to said keto.

20. A compound according to claim 1 wherein B is branched, said branching being at the carbon adjacent to said keto.

References Cited

UNITED STATES PATENTS 3,030,363  4/1962  Konz et al. _____ 260—256
3,029,239  4/1962  Kohlstaedt et al. ____ 260—256

FOREIGN PATENTS 216,011    7/1961   Austria _____ 260—256
759,981    10/1956  Great Britain _____ 260—256
1,079,267  8/1967   Great Britain _____ 260—256

OTHER REFERENCES

Polonovski et al.: Compt. Rend., vol. 240, 1955, pp. 2079–2080.

ALEX MAZEL, Primary Examiner
A. M. T. TIGHE, Assistant Examiner

U.S. Cl. X.R.

424—253, 262, 266

PO-1050
(5/69)

UNITED STATES PATENT OFFICE
CERTIFICATE OF CORRECTION

Patent No. 3,737,433         Dated June 5, 1973

Inventor(s) WERNER MOHLER et al

It is certified that error appears in the above-identified patent and that said Letters Patent are hereby corrected as shown below:

Column 1, line 36, "presenec" should read --presence--; lines 46 to 48, in the formula to the right "  " should read --  --;

line 59, "keto-group" should read --keto-group has a distance of--, "2 to 4 carbon atoms and the " should read --3 to 4--. Column 2, lines 38 to 40, in each formula "  " should read --  --;

line 52, "acetoacetate. The" should read --acetoacetate, the--. Column 4, line 23, "max-" should read --mix- --. Column 5, line 36, "-4' " should read -- -(4'--; line 68, "xanthane (II) Examples 1A and 2),," should read --xanthine (II) (Examples 1A and 2),--. Column 6, line 7, "(XII)" should read --(XIII)--; line 17, in the heading for column 2 and 3 in the table, "G" (each occurrence) should read --g--. Column 7, line 33, "(theophylline(" should read --(theophylline)--. Column 9, line 22, "compounds ... compounds" should read --compounds XVI and XVII by their improved toxicity.--; line 68 to 70, in the formula to the left, "  " should read --  --; line 75, below the formula to the left add --(I)-- and below the formula to the right add --(II)--. Column 10, lines 18 to 24,

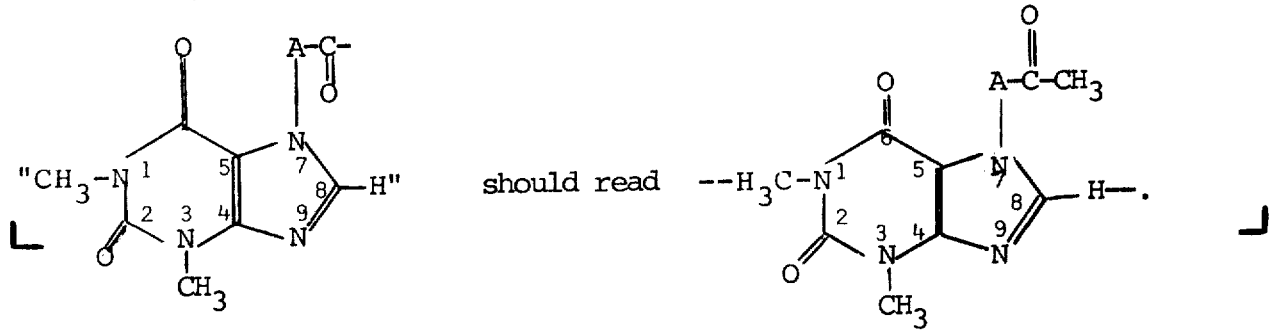

Signed and sealed this 16th day of July 1974.

(SEAL)
Attest:

McCOY M. GIBSON, JR.          C. MARSHALL DANN
Attesting Officer              Commissioner of Patents

UNITED STATES PATENT AND TRADEMARK OFFICE

CERTIFICATE EXTENDING PATENT TERM
UNDER 35 U.S.C. 156

Patent No.    : 3,737,433

Dated         : June 5, 1973

Inventor(s)   : Werner Mohler et al

Patent Owner  : Hoechst Aktiengesellschaft

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of 2,494 days with all rights pertaining thereto as provided by 35 USC 156 (b).

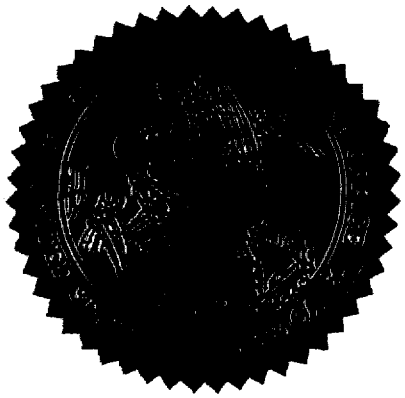

I have caused the seal of the Patent and Trademark Office to be affixed this 8th day of February, 1991.

Harry F. Manbeck, Jr.
Assistant Secretary and Commissioner
   of Patents and Trademarks

REEXAMINATION CERTIFICATE (640th)
United States Patent [19]
Mohler et al.

[11] B1 3,737,433
[45] Certificate Issued Mar. 10, 1987

[54] CERTAIN OXOALKYLDIMETHYLXANTHINES

[75] Inventors: Werner Mohler, Hofheim, Taunus; Mario Reiser; Kurt Popendiker, both of Wiesbaden, all of Fed. Rep. of Germany

[73] Assignee: Chemische Werke Albert Aktiengesellschift, Wiesbaden, Fed. Rep. of Germany

Reexamination Request:
No. 90/000,956, Feb. 11, 1986

Reexamination Certificate for:
Patent No.: 3,737,433
Issued: Jun. 5, 1973
Appl. No.: 854,032
Filed: Aug. 28, 1969

Certificate of Correction issued Jul. 16, 1974.

Related U.S. Application Data

[63] Continuation of Ser. No. 762,989, Sep. 26, 1968, which is a continuation-in-part of Ser. No. 483,803, Aug. 30, 1965.

[30] Foreign Application Priority Data

| Sep. 5, 1964 | [DE] | Fed. Rep. of Germany | C 33,811 |
| Sep. 5, 1964 | [DE] | Fed. Rep. of Germany | C 33,812 |
| Jul. 2, 1965 | [DE] | Fed. Rep. of Germany | C 36,289 |
| Jul. 10, 1965 | [DE] | Fed. Rep. of Germany | C 36,362 |
| Jul. 24, 1965 | [DE] | Fed. Rep. of Germany | C 36,493 |

[51] Int. Cl.$^4$ .................. C07D 473/04; C07D 473/08
[52] U.S. Cl. .................................... 544/271; 514/929
[58] Field of Search ................ 544/266–268, 544/271; 514/263

[56] References Cited

U.S. PATENT DOCUMENTS

| 2,756,229 | 7/1956 | Stall et al. | 544/267 |
| 3,422,107 | 1/1969 | Mohler et al. | 260/256 |

FOREIGN PATENT DOCUMENTS 1079267  8/1967  United Kingdom .

*Primary Examiner*—Robert Gerstl

[57] ABSTRACT

[(ω-1)-oxoalkyl]-3,7-dimethylxanthines in which the oxoalkyl has from 4 to 7 carbon atoms and 7-[(ω-1)-oxoalkyl]-1,3-dimethylxanthines in which the oxoalkyl has from 5 to 8 carbon atoms, while the keto group is separated from the xanthine nucleus by at least two carbon atoms. These compounds have a marked vasodilatory effect with a low toxicity.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *